(12) United States Patent
Miyata et al.

(10) Patent No.: US 10,407,317 B2
(45) Date of Patent: Sep. 10, 2019

(54) FLOATING FILTER MEDIA FILTRATION SYSTEM WITH BACKWASH

(75) Inventors: Atsushi Miyata, Yoshino (JP); Yoshihiko Nakayama, Handa (JP)

(73) Assignee: METAWATER CO., LTD., Tokyo (JP)

( * ) Notice: Subject to any disclaimer, the term of this patent is extended or adjusted under 35 U.S.C. 154(b) by 266 days.

(21) Appl. No.: 13/979,709

(22) PCT Filed: Jan. 18, 2012

(86) PCT No.: PCT/JP2012/000281
§ 371 (c)(1),
(2), (4) Date: Jul. 15, 2013

(87) PCT Pub. No.: WO2012/105172
PCT Pub. Date: Aug. 9, 2012

(65) Prior Publication Data
US 2013/0299409 A1 Nov. 14, 2013

(30) Foreign Application Priority Data

Feb. 2, 2011 (JP) .................................. 2011-020864

(51) Int. Cl.
*C02F 1/24* (2006.01)
*B01D 24/26* (2006.01)
(Continued)

(52) U.S. Cl.
CPC .............. *C02F 1/24* (2013.01); *B01D 24/002* (2013.01); *B01D 24/165* (2013.01); *B01D 24/26* (2013.01);
(Continued)

(58) Field of Classification Search
CPC .... B01D 35/05; B01D 2201/64; B01D 24/16; B01D 24/165; B01D 24/4631;
(Continued)

(56) References Cited

U.S. PATENT DOCUMENTS 5,248,415 A 9/1993 Masuda et al.
6,110,389 A * 8/2000 Horowitz ...................... 210/794
(Continued)

FOREIGN PATENT DOCUMENTS

DE 19546109 A1 * 6/1997 ........... B01D 24/263
EP 1 369 157 A1 12/2003
(Continued)

OTHER PUBLICATIONS

International Search Report issued in International Patent Application No. PCT/JP2012/000281 dated Apr. 3, 2012.
(Continued)

*Primary Examiner* — Lucas A Stelling
*Assistant Examiner* — Angel Olivera
(74) *Attorney, Agent, or Firm* — Oliff PLC

(57) ABSTRACT

The filtration system of the present invention comprises first and second filtration tanks. The first filtration tank has a first floating filter media layer, a first upper screen with a first aperture ratio, a first inlet, a first backwash water supply source, and a first backwash water outlet means. The second filtration tank has a second floating filter media layer, a second upper screen with a second aperture ratio, a second inlet, an inflow blocking mechanism capable of blocking inflow of water to be treated through the second inlet, a second backwash water supply source, and a second backwash water outlet means. The first aperture ratio is smaller than the second aperture ratio.

8 Claims, 4 Drawing Sheets

(51) Int. Cl.
- *B01D 24/00* (2006.01)
- *B01D 24/16* (2006.01)
- *B01D 35/05* (2006.01)
- *C02F 1/00* (2006.01)
- *B01D 24/28* (2006.01)
- *B01D 24/46* (2006.01)

(52) U.S. Cl.
CPC .......... *B01D 24/263* (2013.01); *B01D 24/28* (2013.01); *B01D 24/4631* (2013.01); *B01D 35/05* (2013.01); *C02F 1/004* (2013.01); *B01D 24/007* (2013.01); *C02F 2201/005* (2013.01)

(58) Field of Classification Search
CPC .... B01D 24/002; B01D 29/68; B01D 24/005; B01D 24/007; B01D 29/005; B01D 29/52; B01D 24/26; B01D 24/4621; B01D 24/4684; B01D 2201/14; B01D 2201/202; C02F 1/24; C02F 1/004; C02F 2201/005; C02F 2103/001
USPC ....... 210/275, 150, 151, 196, 248, 617, 618, 210/792, 793, 794, 797, 798
See application file for complete search history.

(56) References Cited

U.S. PATENT DOCUMENTS

| | | | | |
|---|---|---|---|---|
| 2003/0106859 | A1* | 6/2003 | Miyata | ........ B01D 24/005 210/793 |
| 2004/0004036 | A1* | 1/2004 | Nakayama et al. | .......... 210/275 |

FOREIGN PATENT DOCUMENTS

| | | | | |
|---|---|---|---|---|
| FR | 1483205 | A * | 6/1967 | ...... B01D 24/007 |
| JP | A-2003-136088 | | 5/2003 | |
| JP | A-2004-290752 | | 10/2004 | |
| JP | 2005270931 | A * | 10/2005 | |
| JP | A-2005-270931 | | 10/2005 | |
| JP | A-2007-38092 | | 2/2007 | |
| JP | B2-4284222 | | 6/2009 | |
| KR | 10-2006-0106069 | A | 10/2006 | |
| WO | WO 02/081050 | A1 | 10/2002 | |

OTHER PUBLICATIONS

Extended European Search Report issued in Application No. 12741606.3 dated Nov. 11, 2014.

Nov. 27, 2017 Office Action issued in Canadian Application No. 2,826,069.

* cited by examiner

FLOATING FILTER MEDIA FILTRATION SYSTEM WITH BACKWASH

TECHNICAL FIELD

The present invention relates to a filtration system having a plurality of filtration tanks, and particularly to a filtration system used in sewage treatment plants and the like.

BACKGROUND ART

Conventionally, as a filtration tank capable of treating sewage flowing into a sewage treatment plant at a high speed, an upflow filtration tank having a floating filter media layer formed of floating filter media made of foamed resin and an upper screen disposed over the floating filter media layer and supporting the floating filter media is known (see, for example, Patent Literature 1).

In the upflow filtration tank, sewage is passed upward through the floating filter media layer and the suspended solids (SS) in the sewage are captured by the floating filter media layer, thus the sewage is filtered and filtrate water from which suspended solids have been removed can be obtained. Further, in the upflow filtration tank, due to the captured suspended solids, a pressure loss is increased in the floating filter media layer during passage of sewage, and when the filtration tank cannot provide a desired filtration performance, backwash water is passed downward through the floating filter media layer and the captured suspended solids are discharged by spreading the floating filter media downward, thus the floating filter media layer is backwashed (i.e. cleaned by back-flow) and a filtration performance of the filtration tank can be recovered.

In the above-described conventional upflow filtration tank, backwash water flow can concentrate only on a portion where water can flow easily (a water path is formed) during backwashing. Further, when only the portion where a water path has been formed during backwashing is washed, a portion where a relatively large amount of suspended solids have been captured (heavily clogged portion) and a portion where a relatively small amount of suspended solids have been captured (lightly clogged portion) can be produced in the floating filter media layer. Then, once both the heavily clogged portion and the lightly clogged portion are produced in the floating filter media layer, flow of backwash water concentrates only on the lightly clogged portion where water can flow easily during backwashing. Thus a floating filter media does not uniformly spread across the floating filter media layer, and the floating filter media layer cannot be thoroughly and uniformly backwashed. Further, when flow of backwash water concentrates on the lightly clogged portion, flow rate of the backwash water on the lightly clogged portion is increased, which causes the floating filter media to spread excessively downward, and to flow out from the outlet of backwash water disposed in the lower part of the filtration tank.

Thus, as a method of washing by distributing backwash water uniformly across the entire floating filter media layer during backwashing and is by spreading floating filter media uniformly, it has been suggested that the percentage of the aperture (aperture ratio=(aperture area/upper screen area) ×100) provided on the upper screen of the filtration tank be a certain value within a range of 1 to 30% (see, for example, Patent Literature 2).

CITATION LIST

Patent Literature

PTL 1: JP2003136088 (A)
PTL 2: Japanese Patent No. 4284222

SUMMARY OF INVENTION

Technical Problem

However, with the above-described conventional filtration tank in which an aperture ratio of the upper screen is a certain value within a range of 1 to 30%, it has been difficult to achieve both uniform backwashing of floating filter media layer and efficient backwashing with low cost when water to be treated such as sewage whose flow amount varies with time is treated.

More specifically, for example, in examining the case where combined sewage, which is wastewater and rainwater collected in the same conduit, is treated by the above-described conventional filtration tank, achievement of both uniform backwashing of floating filter media layer and efficient backwashing with low cost was difficult for the following reasons.

In the conventional filtration tank, under sunny weather conditions where there is no rainwater inflow and only wastewater is filtered, water to be treated consisting of wastewater that contains fine suspended solids at a high concentration passes through the floating filter media layer at a low flow rate. Thus, under sunny weather conditions, since fine suspended solids penetrate deep into the floating filter media layer (i.e. penetrate into upper side of the floating filter media layer) and solidly clog the floating filter media layer, the floating filter media layer cannot be backwashed uniformly during backwashing unless the aperture ratio of the upper screen is extremely reduced. On the other hand, under rainy weather conditions where rainwater inflows and combined water of wastewater and rainwater is filtered, water to be treated consisting of rainwater that contains relatively coarse suspended solids and wastewater pass through the floating filter media layer at a high flow rate, and most of the suspended solids in the water to be treated are captured by the whole surface near the surface layer (lower side) of the floating filter media layer. Therefore, under rainy weather conditions, the floating filter media layer can be uniformly backwashed during backwashing even if the aperture ratio of the upper screen is rather large. Thus, in the conventional filtration tank, when the aperture ratio of the screen is set to be smaller for sunny weather conditions to allow for uniform backwashing under both sunny and rainy weather conditions, under sunny weather conditions, water to be treated can be filtered by a filtration tank having a screen with an aperture ratio suitable for backwashing, however, under rainy weather conditions, water to be treated is filtered by a filtration tank with an unnecessarily small aperture ratio. Therefore, in a filtration tank having a screen with a small aperture ratio, a passing resistance of backwash water when it passes through the upper screen is unnecessarily large under rainy weather conditions, and thus the facility specification (e.g., vales and piping necessary for discharging backwash water, or pumps for discharging backwash water) necessary for flowing backwash water downward at a predetermined flow rate is expanded, thus resulting in increase in cost.

Thus, there has been a need for a filtration system capable of achieving both uniform backwashing of floating filter media layer and efficient backwashing with low cost even if water to be treated such as sewage whose flow amount varies with time is treated.

Solution to Problem

The purpose of the invention is to solve the above-described problem. The filtration system of the present invention is a filtration system having a plurality of filtration tanks for filtering water to be treated, the filtration system comprising a first filtration tank having a first floating filter media layer formed of floating filter media, a first upper screen with a first aperture ratio, the first upper screen being disposed over the first floating filter media layer and supporting the floating filter media, a first inlet for water to be treated disposed below the first floating filter media layer, a first backwash water supply source located over the first upper screen, and a first backwash water outlet means disposed below the first floating filter media layer and discharging backwash water supplied from the first backwash water supply source during backwashing of the first floating filter media layer; and a second filtration tank having a second floating filter media layer formed of floating filter media, a second upper screen with a second aperture ratio, the second upper screen being disposed over the second floating filter media layer and supporting the floating filter media, a second inlet for water to be treated disposed below the second floating filter media layer, an inflow blocking mechanism capable of blocking inflow of water to be treated through the second inlet for water to be treated, a second backwash water supply source located over the second upper screen, and a second backwash water outlet means disposed below the second floating filter media layer and discharging backwash water supplied from the second backwash water supply source during backwashing of the second floating filter media layer, in which the first aperture ratio is smaller than the second aperture ratio. Thus, if the aperture ratio of the first upper screen of the first filtration tank (first aperture ratio) is set to be smaller than that of the second upper screen of the second filtration tank (second aperture ratio), and the inflow blocking mechanism capable of blocking inflow of water to be treated to the second filtration tank is provided, when the flow amount of water to be treated is small, inflow of water to be treated through the second inlet for water to be treated is blocked by the inflow blocking mechanism and water to be treated can be filtered by using only the first filtration tank having an upper screen with a low aperture ratio. Further, when the flow amount of water to be treated is increased, blockage of inflow of water to be treated by the inflow blocking mechanism is cancelled to allow the water to be treated to flow from the second inlet for water to be treated into the second filtration tank, thus in addition to the first filtration tank, water to be treated can be filtered by the second filtration tank having an upper screen with a high aperture ratio. Thus, when flow amount of water to be treated is small, filtration is performed by using the first filtration tank capable of uniformly backwashing the floating filter media layer even if fine suspended solids penetrate deep into the floating filter media layer and the floating filter media layer is solidly clogged, and when flow amount of water to be treated is large, a large amount of water to be treated can be filtered through a large filtering area by using the second filtration tank in addition to the first filtration tank. Therefore, even if flow amount of water to be treated varies with time, the first filtration tank and the second filtration tank can achieve both uniform backwashing of floating filter media layer and efficient backwashing with low cost.

Here, in the filtration system of the present invention, preferably the first aperture ratio is 0.5 to 5% and the second aperture ratio is 2 to 30%. If the first aperture ratio is from 0.5% or more to 5% or less and the second aperture ratio is from 2% or more to 30% or less, ultra-fine suspended solids are sufficiently removed and clean filtrate water can be obtained.

Further, in the filtration system of the present invention, the area of the first filtration tank is preferably 0.5 times to twice that of the second filtration tank. If the area of the first filtration tank is 0.5 times or more that of the second filtration tank, the area of the first filtration tank can be sufficiently ensured and when the flow amount of water to be treated is small, water to be treated can be efficiently filtered. Moreover, if the area of the first filtration tank is 2 times or less that of the second filtration tank, the area of the second filtration tank can be sufficiently ensured and when the flow amount of water to be treated is large, the water to be treated can be efficiently filtered. It should be noted that, in the present invention, the area of filtration tank refers to a horizontal cross-sectional area of the filtration tank on the position where the upper screen is disposed.

Moreover, preferably, the filtration system of the present invention further comprises an inflow blocking mechanism capable of blocking inflow of water to be treated through the first inlet for water to be treated. If the inflow blocking mechanism capable of blocking inflow of water to be treated to the first filtration tank is provided, when the first filtration tank is backwashed, inflow of water to be treated through the first inlet for water to be treated is blocked by the inflow blocking mechanism, and thus decrease in backwash efficiency caused by inflow of water to be treated to the first filtration tank can be prevented.

Advantageous Effect of Invention

According to the filtration system of the present invention, both uniform backwashing of floating filter media layer and efficient backwashing with low cost can be achieved even if flow amount of water to be treated varies with time.

BRIEF DESCRIPTION OF DRAWINGS

FIG. 5 is an explanatory diagram showing a configuration of another filtration system according to the present invention, in which FIG. 5(a) shows a configuration of the filtration system in planar view and FIG. 5(b) shows a cross-sectional view taken from line of FIG. 5(a).

DESCRIPTION OF EMBODIMENTS

Embodiments of the present invention will now be described below with reference to the accompanying drawings. The filtration system according to the present invention is a system suitable for filtering the water to be treated whose flow amount significantly varies with time such as combined sewage, separate sewage (wastewater), river water and road runoff water. It should be noted that, in the separate sewage, wastewater and rainwater are passed respectively through separate pipes and rainwater is directly discharged into rivers, thus when separate sewage is treated, only wastewater whose flow variation with time is small is usually treated (filtered) by the filtration system of the present invention. However, even in the case of separate sewage, rainwater can seep from the soil into the pipe for wastewater under rainy weather conditions, and thus the flow amount of wastewater, which is water to be treated, can largely vary with time.

An example of the filtration system in accordance with the present invention is a filtration system that is installed in a sewage treatment plant and is used for filtering combined sewage as water to be treated. Thus in this filtration system, only wastewater is filtered as water to be treated under sunny weather conditions where no rainwater inflows, and combined water of wastewater and rainwater is filtered as water to be treated under rainy weather conditions.

Figure 1:
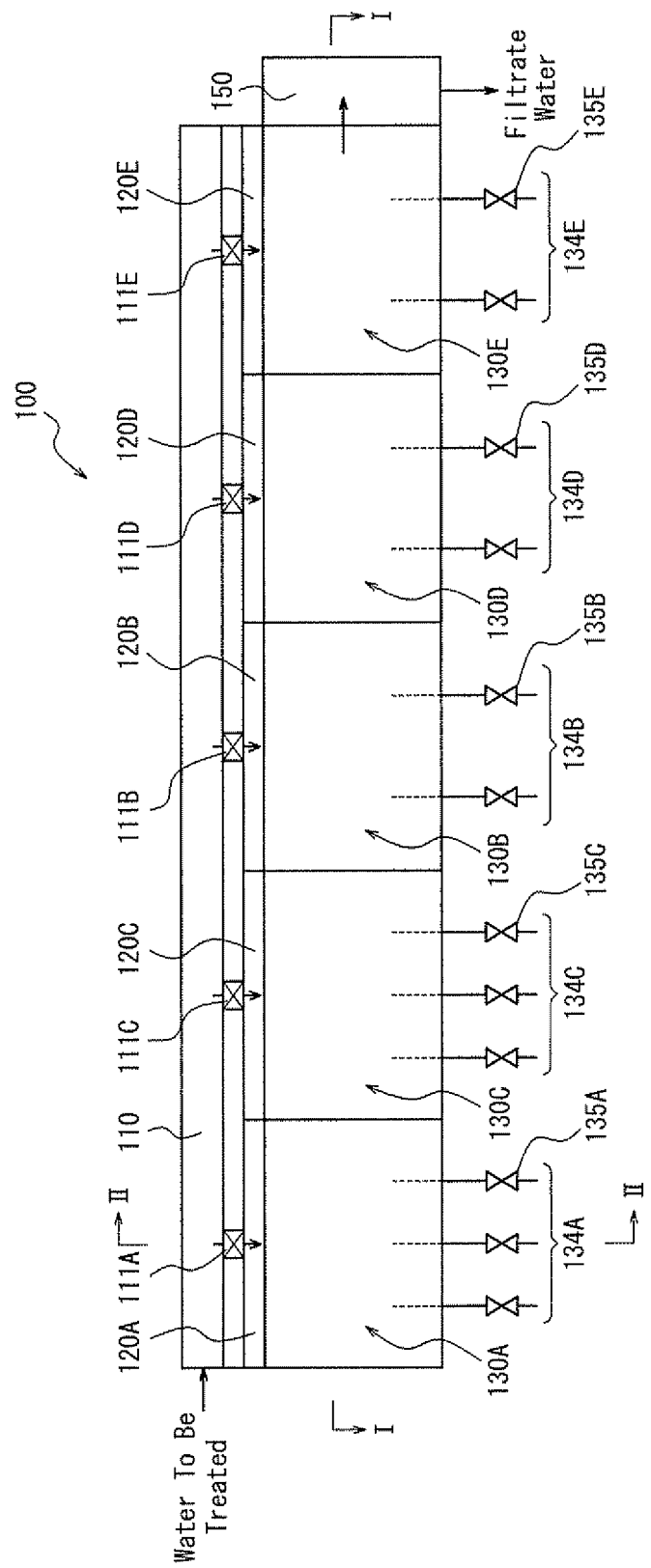
FIG. 1 is an explanatory diagram showing a configuration of a representative filtration system according to the present invention in planar view.
Figure 2:
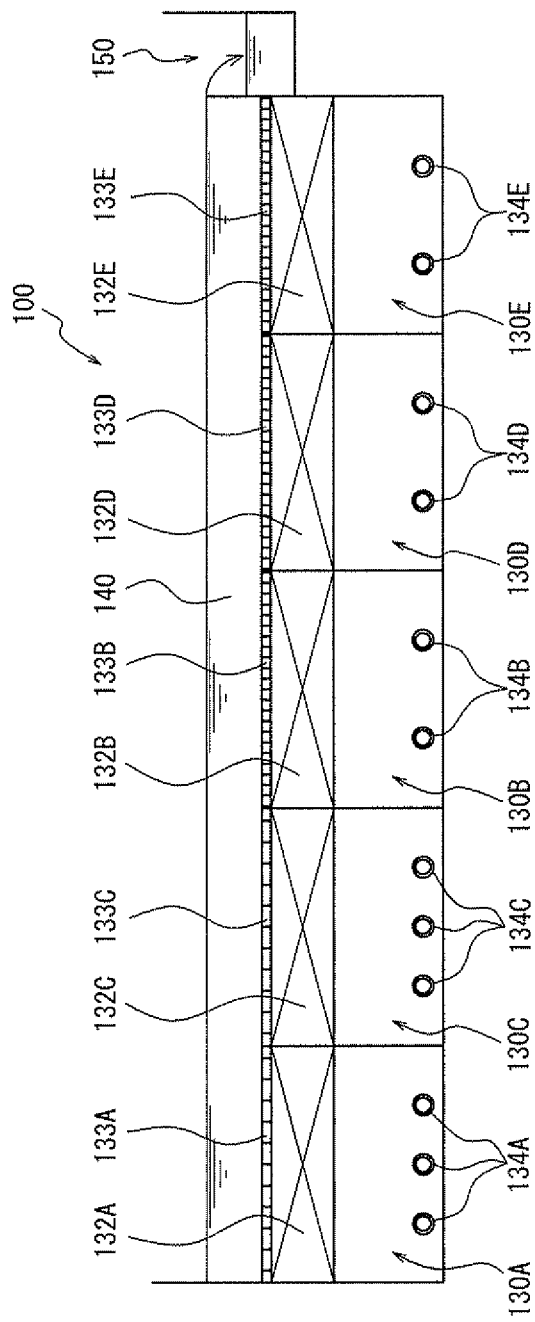
FIG. 2 is an explanatory diagram showing a cross-sectional view of the filtration system of FIG. 1 taken from line I-I.
Figure 3:
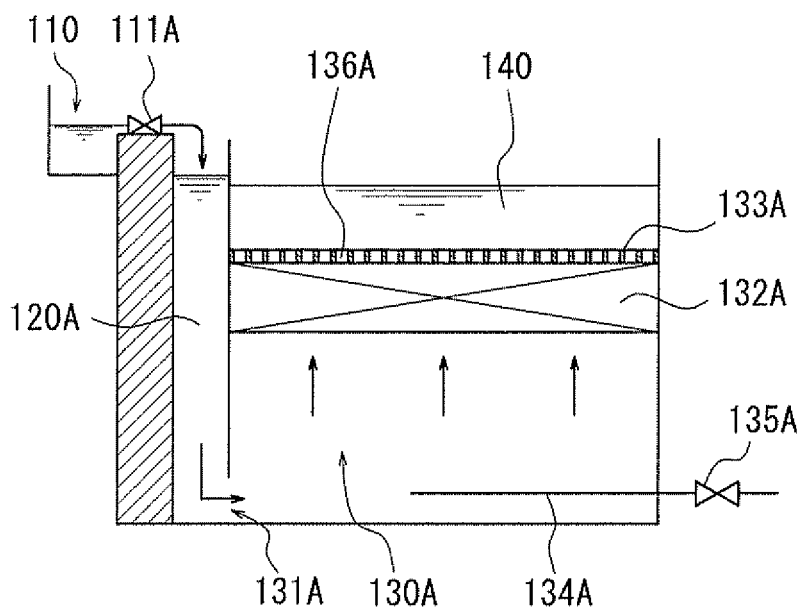
FIG. 3 is an explanatory diagram showing a cross-sectional view of the filtration system of FIG. 1 taken from line II-II.

As shown in FIGS. 1 to 3, the filtration system 100 according to the example has a flow channel for water to be treated 110 through which water to be treated that has been pumped up by a pump (not shown) flows, five filtration tanks (from left in FIG. 1, a first filtration tank 130A, a third filtration tank 130C, a second filtration tank 13013, a fourth filtration tank 130D and a fifth filtration tank 130E) for filtering water to be treated that has overflowed from the flow channel for water to be treated 110, a filtrate storage part 140 that stores filtrate water obtained through filtration of water to be treated by respective filtration tanks 130A to 130E and is common to five filtration tanks 130A to 130E, and a filtrate flow channel 150 through which the filtrate water that has overflowed from the filtrate storage part 140 flows out of the filtration system 100.

Here, in the filtration system 100, the first filtration tank 130A and the third filtration tank 130C corresponding to the "first filtration tank" of the present invention have the same structure, and the second filtration tank 130B, the fourth filtration tank 130D and the fifth filtration tank 130E corresponding to the "second filtration tank" of the present invention have the same structure. Thus basically the first filtration tank 130A and the second filtration tank 130B are explained below, and unless otherwise noted, explanations of the third filtration tank 130C, the fourth filtration tank 130D and the fifth filtration tank 130E are omitted.

The flow channel for water to be treated 110 extends in a longitudinal direction (left-right direction in FIG. 1) of the filtration system 100, which is, in the direction parallel to the layout direction of the filtration tanks 130A to 130E arranged side by side. As can be seen from the cross-sectional view taken from line II-II of FIG. 1 in FIG. 3, the flow channel for water to be treated 110 is not installed directly on the ground, and is disposed in the air, and in FIG. 1, water to be treated that is pumped up by the pump (not shown) flows from left to right through the flow channel for water to be treated 110.

As can be seen from FIG. 2 showing a cross-sectional view taken from line I-I of FIG. 1 and FIG. 3 showing a cross-sectional view taken from line II-II of FIG. 1, the first filtration tank 130A has a first floating filter media layer 132A formed of floating filter media 132 and a first upper screen 133A that is disposed over the first floating filter media layer 132A and supports the floating filter media 132 (in other words, prevents the floating filter media 132 from flowing out upward). Further, the first upper screen 133A is provided with a plurality of apertures, each of them is smaller than each of the floating filter media 132 and has a first aperture ratio $A_1$. Moreover, a filtrate storage part 140 is located over the first upper screen 133A of the first filtration tank 130A, and the filtrate storage part 140 serves as a first backwash water supply source that supplies filtrate water as backwash water when the first floating filter media layer 132A is backwashed. Further, three first backwash water pipes 134A extending to the outside of the first filtration tank 130A are provided below the first floating filter media layer 132A of the first filtration tank 130A. Each of the first backwash water pipes 134A has an openable/closable first backwash valve 135A. The first backwash water pipe 134A and first backwash valve 135A serve as a first backwash water outlet means for discharging backwash water (filtrate water) flowing downward from the filtrate storage part 140 through the first floating filter media layer 132A when the first floating filter media layer 132A is backwashed.

It should be noted that the first aperture ratio $A_1$ of the first upper screen 133A of the first filtration tank 130A is relatively small and a resistance when filtrate water (backwash water) passes through the first upper screen 133A during backwashing is large. Thus in the first filtration tank 130A, three first backwash water pipes 134A are provided to ensure a flow rate of backwash water effective to backwashing, although it comes at a price. It should be noted that, in the filtration system of the present invention, as the first backwash water outlet means, a pump having a discharge rate that can ensure the flow rate of backwash water effective to backwashing may be used.

Further, as shown in FIG. 3, the flow channel for water to be treated 110 and the first filtration tank 130A are connected through an overflow part over which water to be treated flows from the flow channel for water to be treated 110 and a first pressure adjustment part 120A into which the water to be treated that has flowed from the flow channel for water to be treated 110 over the overflow part is flowed. In addition, the overflow part is provided with an openable/closable first inlet valve 111A as an inflow blocking mechanism. Moreover, the first pressure adjustment part 120A extending in an approximately vertical direction and the first filtration tank 130A are communicated by the first inlet for water to be treated 131A provided below the first floating filter media layer 132A. The first pressure adjustment part 120A is configured so that a difference in water level between the flow channel for water to be treated 110 and the first filtration tank 130A (more specifically, the filtrate storage part 140) can be ensured. Further, the first pressure adjustment part 120A is a conduit for ensuring and adjusting the filtration loss of head (the difference in water level between the first pressure adjustment part 120A and the first filtration tank 130A) that rises when the water to be treated that has overflowed from the flow channel for water to be treated 110 is flowed into the first filtration tank 130A and filtered by the first floating filter media layer 132A. Thus, in the filtration system of the present invention, without the need for providing the flow channel for water to be treated 110 and the first pressure adjustment part 120A, water to be treated can be directly delivered to the lower part of the first filtration tank 130A by a pump, etc., and the inflow blocking mechanism is not limited to an inlet valve (e.g. a gate vale, a ball valve, etc.) and can be formed of a drop plate.

As shown in FIG. 2, the second filtration tank 130B has a second floating filter media layer 132B formed of floating filter media 132 and a second upper screen 133B that is disposed over the second floating filter media layer 132B and supports the floating filter media 132 (in other words, prevents the floating filter media 132 from flowing out upward). Further, the second upper screen 133B is provided with a plurality of apertures, each of them is smaller than each of the floating filter media 132 and has a second aperture ratio $A_2$, which is larger than the first aperture ratio $A_1$ ($A_2 > A_1$). Moreover, the filtrate storage part 140 is located over the second upper screen 133B of the second filtration tank 130B, and the filtrate storage part 140 serves as a second backwash water supply source that supplies filtrate water as backwash water when the second floating filter media layer 132B is backwashed. Further, two second backwash water pipes 134B extending to the outside of the second filtration tank 130B are provided below the second floating filter media layer 132B of the second filtration tank 130B, and each of the second backwash water pipes 134B has an openable/closable second backwash valve 135B. These second backwash water pipes 134B and second backwash valves 135B serve as a second backwash water outlet means for discharging backwash water (filtrate water) flowing downward from the filtrate storage part 140 through the second floating filter media layer 132B when the second floating filter media layer 132B is backwashed.

It should be noted that the second aperture ratio $A_2$ of the second upper screen 133B of the second filtration tank 130B is relatively large and the resistance of the filtrate water (backwash water) when it passes through the second upper screen 133B during backwashing is small. Thus in the second filtration tank 130B, two second backwash water pipes 134B are provided to ensure a flow rate of backwash water effective to backwashing and to reduce cost. Moreover, in the filtration system of the present invention, as the second backwash water outlet means, a pump having a discharge rate that can ensure the flow rate of backwash water effective to backwashing may be used.

Further, the flow channel for water to be treated 110 and the second filtration tank 130B are connected through an overflow part over which water to be treated flows from the flow channel for water to be treated 110 and a second pressure adjustment part 120B into which the water to be treated that has flowed from the flow channel for water to be treated 110 over the overflow part is flowed. In addition, the overflow part is provided with an openable/closable second inlet valve 111B as an inflow blocking mechanism. Moreover, the second pressure adjustment part 120E extending in an approximately vertical direction and the second filtration tank 130B are communicated by the second inlet for water to be treated (not shown) provided below the second floating filter media layer 132B. It should be noted that the second pressure adjustment part 120B is configured so that a difference in water level between the flow channel for water to be treated 110 and the second filtration tank 130B (more specifically, the filtrate storage part 140) can be ensured. Furthermore, the second pressure adjustment part 120B is a conduit for ensuring and adjusting the filtration loss of head (the difference in water level between the second pressure adjustment part 120B and the second filtration tank 130B) that rises when the water to be treated that has overflowed from the flow channel for water to be treated 110 is flowed into the second filtration tank 130B and filtered by the second floating filter media layer 132B. Thus, in the filtration system of the present invention, without the need for providing the flow channel for water to be treated 110 and the second pressure adjustment part 120B, water to be treated can be directly delivered to the lower part of the second filtration tank 130B by a pump, etc., and the inflow blocking mechanism is not limited to an inlet valve (e.g. a gate vale, a ball valve, etc.) and can be formed of a drop plate.

Here, as the floating filter media 132 forming the first floating filter media layer 132A and the second floating filter media layer 132B, the known floating filter media such as the floating filter media formed of closed-cell foamed polyethylene can be used. Further, the density of the floating filter media 132 before and/or during the use thereof is preferably from more than 0.4 g/cm³ to less than or equal to 0.8 g/cm³.

As the first upper screen 133A and the second upper screen 133B, there is no particular material used therefor, and anything that can prevent the floating filter media 132 from flowing out such as punching metal can be used.

The filtrate storage part 140 extends across the upper surface from the first filtration tank 130A to the fifth filtration tank 130E, and the filtrate storage part 140 stores filtrate water obtained by filtering the water to be treated through each of floating filter media layers 132A to 132E. Further, the filtrate water stored in the filtrate storage part 140 overflows into the filtrate flow channel 150 located on the right side of the fifth filtration tank 130E in FIG. 1 and flows out of the filtration system 100.

In the filtration system 100, water to be treated is efficiently filtered depending on the flow amount of water to be treated that widely varies depending on the weather conditions, sunny or rainy, as described below.

<Under Sunny Weather Conditions>

In the filtration system 100, under sunny weather conditions where no rainwater inflows, only wastewater that contains fine suspended solids at a high concentration is treated, and thus the flow amount of water to be treated is smaller than that under rainy weather conditions.

Here, when only low flow of wastewater is filtered as water to be treated, wastewater passes through the floating filter media layer at a low flow rate, and fine suspended solids in the wastewater penetrate deep into the floating filter media layer (i.e. penetrate into upper side of the floating filter media layer), and thus the floating filter media layer is solidly clogged. Therefore, when only wastewater is filtered as water to be treated, it is necessary to perform filtration by a filtration tank having an upper screen with a small aperture ratio such that floating filter media can be uniformly spread when the floating filter media layer is backwashed. Further, it is assumed that a pressure loss is increased when backwash water passes through the screen and water flows uniformly from the screen, and as a result thereof, the floating filter media can be uniformly spread during backwashing by reducing the aperture ratio of the upper screen.

Thus in the filtration system 100, under sunny weather conditions where flow amount of water to be treated is small, water to be treated is filtered only by the first filtration tank 130A and the third filtration tank 130C having an upper screen with a first aperture ratio $A_1$, and the second filtration tank 130B, the fourth filtration tank 130D and the fifth filtration tank 130E having an upper screen with a second aperture ratio $A_2$, which is larger than the first aperture ratio $A_1$, are not used for filtration of water to be treated.

In other words, under sunny weather conditions, the first inlet valve 111A and the third inlet valve 111C are opened to allow water to be treated to flow into the first filtration tank 130A and the third filtration tank 130C. On the other hand, the second inlet valve 111B, the fourth inlet valve 111D and the fifth inlet valve 111E are closed to block inflow of water to be treated to the second filtration tank 130B, the fourth filtration tank 130D and the fifth filtration tank 130E.

Thus, to explain with reference to the first filtration tank 130A, as shown in FIG. 3, water to be treated flows from the flow channel for water to be treated 110 to the first pressure adjustment part 120A through the first inlet valve 111A. After that, the water to be treated flows into the first filtration tank 130A through the first inlet for water to be treated 131A, then flows upward through the first filtration tank 130A and is filtered by the first floating filter media layer 132A. Then the resulting filtrate water is stored in the filtrate storage part 140. It should be noted that the water to be treated is filtered by the third filtration tank 130C in the same manner. Further, since flow amount of water to be treated is small under sunny weather conditions, water to be treated can be sufficiently filtered by using only the first filtration tank 130A and the third filtration tank 130C.

Figure 4:
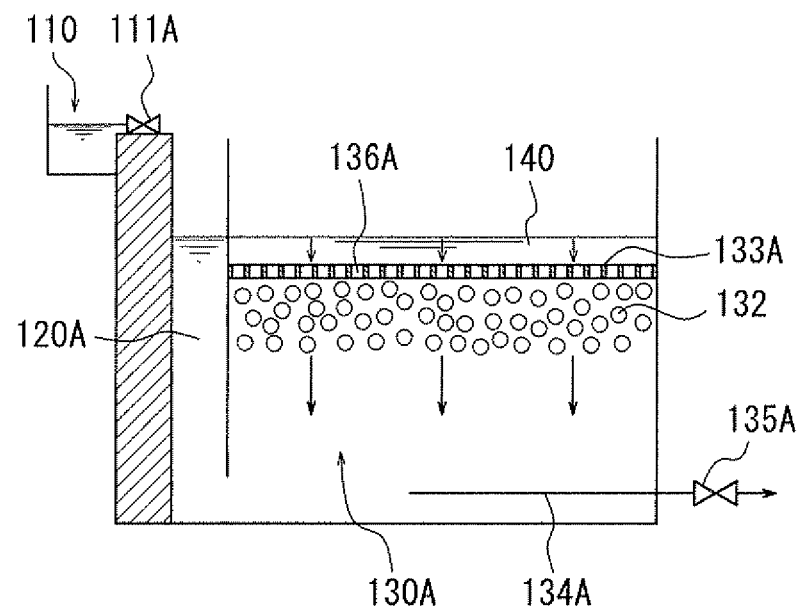
FIG. 4 is an explanatory diagram showing a state where a floating filter media layer is backwashed in the filtration system of FIG. 1 in the same position (taken from line II-II) as that of FIG. 3.

Here, when the first floating filter media layer 132A is clogged due to filtration of water to be treated and a filtration differential pressure is increased over a predetermined value, the first inlet valve 111A is closed to stop inflow of water to be treated and, as shown in FIG. 4, all the three first backwash valves 135A are opened to allow filtrate water stored in the filtrate storage part 140 to flow downward as backwash water, then the floating filter media 132 forming the first floating filter media layer 132A is uniformly spread downward. Thereafter, suspended solids captured by the first floating filter media layer 132A and backwash water are discharged together from the three first backwash water pipes 134A. It should be noted that it is not necessary to close the first inlet valve 111A during backwashing of the first floating filter media layer 132A, however, in the light of prevention of decrease in backwash efficiency due to continuous inflow of water to be treated during backwashing and of decrease in a collection rate of filtrate water (=obtained filtrate water amount/inflow amount of water to be treated), it is preferred that backwashing is performed while the first inlet valve 111A is closed. Further, under sunny weather conditions, the floating filter media layer is solidly clogged by fine suspended solids, thus in the light of prevention of decrease in downward flow rate of backwash water due to inflow of water to be treated and washing of floating filter media layer using backwash water at a sufficient flow rate, it is preferred that backwashing is performed while the first inlet valve 111A is closed. It should be noted that, in the filtration system 100, filtration of water to be treated can be continued by using the third filtration tank 130C even when the first floating filter media layer 132A is backwashed.

<Under Rainy Weather Conditions>

On the other hand, in the filtration system 100, under rainy weather conditions where rainwater inflows in addition to wastewater, combined water of rainwater containing relatively coarse suspended solids and wastewater is treated, and the flow amount of water to be treated is larger than that under sunny weather conditions. More specifically, the flow amount of water to be treated under rainy weather conditions is twice to 10 times that under sunny weather conditions.

Here, in the case where large flow of combined water is filtered as water to be treated, since the combined water passes through the floating filter media layer at a high flow rate and the particle diameter of the suspended solids in the combined water is large, most of the suspended solids in the combined water are captured by the whole surface near the surface layer (lower side) of the floating filter media layer. Thus, when the combined water is filtered as water to be treated, even if the aperture ratio of the upper screen is large to some degree, the floating filter media layer can be uniformly backwashed when it is backwashed. Further, in the light of increase in the flow rate of backwash water by decreasing a passing resistance of backwash water as much as possible when it passes through the upper screen and of cost reduction by decreasing the number of backwash valves and backwash water pipes necessary for flowing the backwash water downward and by decreasing the diameter of backwash water pipe, it is preferred that, under rainy weather conditions, a filtration tank having an upper screen with a large aperture ratio is used for filtration.

Thus, in the filtration system 100, under rainy weather conditions where flow amount of water to be treated is large, water to be treated is filtered by using not only the first filtration tank 130A and the third filtration tank 130C having an upper screen with a first aperture ratio $A_1$, but also the second filtration tank 130B, the fourth filtration tank 130D and the fifth filtration tank 130E having an upper screen with a second aperture ratio $A_2$ that is larger than the first aperture ratio $A_1$.

In other words, under rainy weather conditions, all the inlet valves from the first inlet valve 111A to the fifth inlet valve 111E are opened to allow the water to be treated to flow into all the filtration tanks from the first filtration tank 130A to the fifth filtration tank 130E.

Further, in the same manner as explained above about filtration of water to be treated by using the first filtration tank 130A with reference to FIG. 3, combined water is filtered by using the first filtration tank 130A to the fifth filtration tank 130E and obtained filtrate water is stored in the filtrate storage part 140.

Moreover, even if filtration of water to be treated causes the floating filter media layer to be clogged and a filtration differential pressure to be increased to more than a predetermined value, as in the case of the first filtration tank 130A described above, backwashing can be performed by using filtrate water as backwash water. It should be noted that, in the filtration system 100, even when the first floating filter media layer 132A is backwashed, filtration of water to be treated can be continued by using the second filtration tank 130B to the fifth filtration tank 130E.

Moreover, according to the filtration system 100, in the case where flow amount of water to be treated is small under sunny weather conditions, etc., water to be treated can be filtered by using the first filtration tank 130A and the third filtration tank 130C having an upper screen with a low aperture ratio that can uniformly backwash the floating filter media layer even if fine suspended solids penetrate deep into the floating filter media layer and floating filter media layer is solidly clogged. Further, in the case where flow amount of water to be treated is large under rainy weather conditions, etc., water to be treated can be filtered by using additionally the second filtration tank 130B, the fourth filtration tank 130D and the fifth filtration tank 130E having an upper screen with a high aperture ratio in which a passing resistance of backwash water when it passes through the upper screen small and backwash water can be passed through the floating filter media layer efficiently and at low cost. Therefore, unlike the conventional filtration system in which all upper screens are designed to have an aperture ratio suitable for the case where the flow amount of water to be treated is small, in the filtration system 100, different filtration tanks can be used based on the flow amount of water to be treated. Further, in the filtration system 100, even if the flow amount of water to be treated varies with time, both uniform backwashing of floating filter media layer and efficient backwashing with low cost can be achieved.

Here, in the filtration system 100, in the light of sufficient removal of even ultra-fine suspended solids (less than 50 μm in particle diameter) under sunny weather conditions, it is preferred that the first aperture ratio $A_1$ is from 0.5% or more to 5% or less and filtration is performed at a low speed (e.g. filtration rate of 100 m/day). Further, in the light of removal of only fine suspended solids (from 50 μm or more to 100 μm or less in particle diameter) and normal suspended solids (over 100 μm in particle diameter) under sunny weather conditions, it is preferred that the first aperture ratio $A_1$ is over 5% and filtration is performed at a relatively high speed (e.g. filtration rate of 500 m/day). Moreover, in the light of sufficient removal of even ultra-fine suspended solids (less than 50 μm in particle diameter) under rainy weather conditions, it is preferred that the second aperture ratio $A_2$ is from 2% or more to 30% or less and filtration is performed at a high speed (e.g. filtration rate of 1000 m/day). Further, in the light of removal of only normal suspended solids (over 100 μm in particle diameter) under rainy weather conditions, it is preferred that the second aperture ratio $A_2$ is over 30% and filtration is performed at a high speed (e.g. filtration rate of 1500 m/day).

Therefore, in the light of sufficient removal of ultra-fine suspended solids to obtain clean filtrate water, it is preferred that the first aperture ratio $A_1$ is from 0.5% or more to 5% or less and the second aperture ratio $A_2$ is from 2% or more to 30% or less.

Further, in the light of efficient filtration of water to be treated when flow amount of water to be treated is small, it is preferred that the total area of the first filtration tank 130A and the third filtration tank 130C is 0.5 times or more that of the second filtration tank 130B, the fourth filtration tank 130D and the fifth filtration tank 130E. Moreover, in the light of efficient filtration of water to be treated when flow amount of water to be treated is large, it is preferred that the total area of the first filtration tank 130A and the third filtration tank 130C is twice or less that of the second filtration tank 130B, the fourth filtration tank 130D and the fifth filtration tank 130E. In addition, it is preferred that each filtration tank has an area enough to obtain the flow amount per unit area of filtration tank in the range of 100 to 500 m$^3$/m$^2$·day when water to be treated is filtered under sunny weather conditions by using only the first filtration tank 130A and the third filtration tank 130C and the flow amount per unit area of filtration tank in the range of 500 to 1500 m$^3$/m$^2$·day, or particularly 1000 to 1500 m$^3$/m$^2$·day when water to be treated is filtered under rainy weather conditions by using all the filtration tanks.

Figure 5:
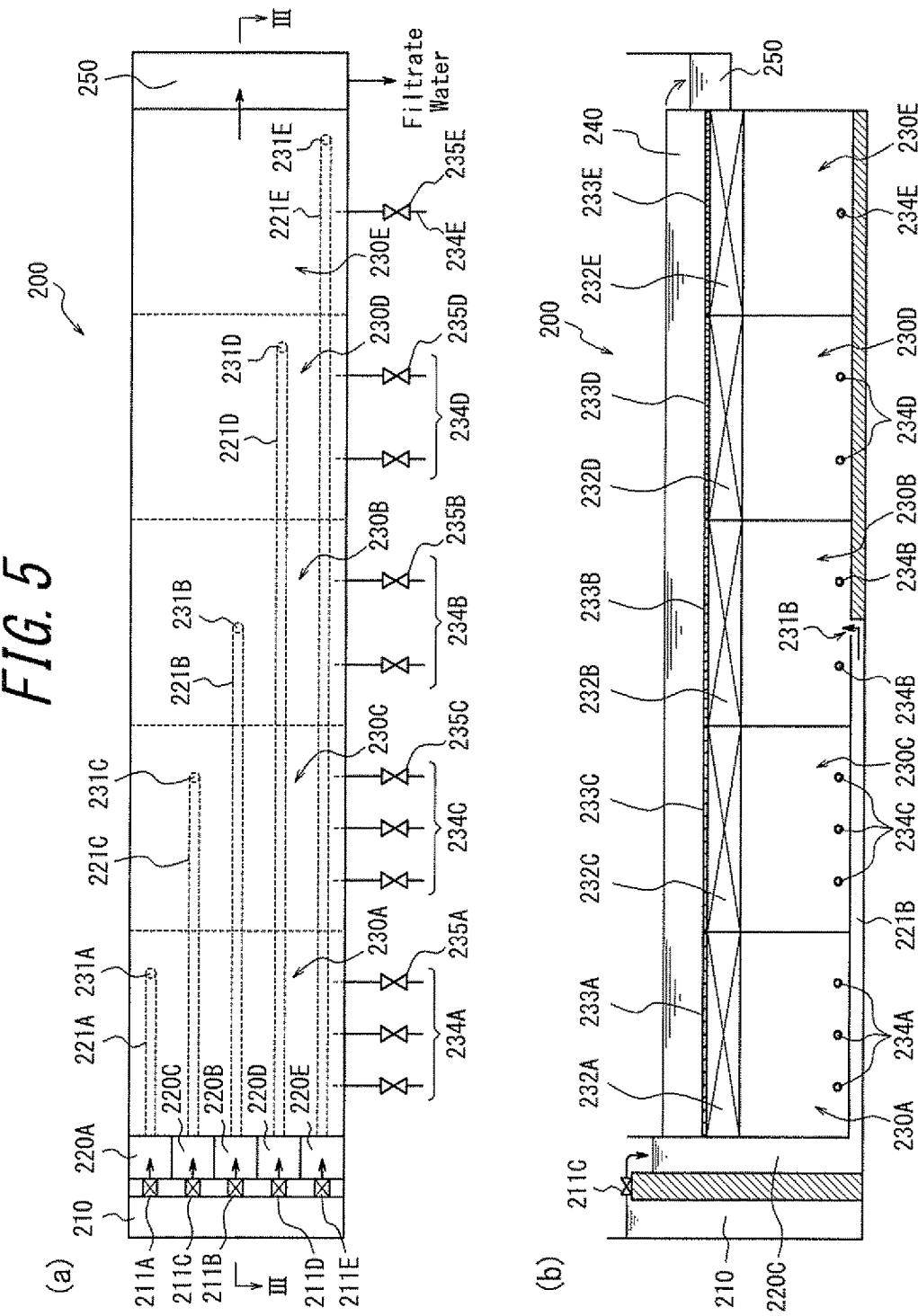

Here, the filtration system of the present invention can be configured as shown in FIGS. 5 (a) and (b), for example. FIG. 5(a) shows a configuration of a filtration system in planar view and FIG. 5(b) shows a cross-sectional view taken from line III-III of FIG. 5(a).

The filtration system 200 of another example is configured in the same way as the filtration system illustrated above, with the exception that a tank for water to be treated 210 directly installed on the ground is used instead of the flow channel for water to be treated 110, the tank for water to be treated 210 is extended at a right angle to the longitudinal direction of the filtration system 200 (up-down direction in FIG. 5), the overflow part where inlet valves 211A to 211E are disposed and pressure adjustment parts 220A to 220E are disposed adjacent the left side of the first filtration tank 230A and at a right angle to the longitudinal direction of the filtration system 200 in FIG. 5, inlets for water to be treated 231A to 231E are disposed respectively on each bottom of filtration tanks 230A to 230E, water to be treated flowed into pressure adjustment parts 220A to 220E flows from inlets for water to be treated 231A to 231E into filtration tanks 230A to 230E through inlet pipes for water to be treated 221A to 221E embedded respectively under respective filtration tanks 230A to 230E, the aperture ratio of the fifth upper screen 233E of the fifth filtration tank 230E is a third aperture ratio $A_3$ that is larger than the second aperture ratio $A_2$, and the number of fifth backwash water pipe 234E provided in the fifth filtration tank 230E is one.

Further, in the filtration system 200 of another example, under sunny weather conditions where flow amount of water to be treated is small, filtration is performed by the first filtration tank 230A and the third filtration tank 230C. Moreover, under rainy weather conditions where flow amount of water to be treated is relatively large, in addition to the first filtration tank 230A and the third filtration tank 230C, filtration is performed by using also the second filtration tank 230B and the fourth filtration tank 230D. Furthermore, under heavy rain conditions where flow amount of water to be treated is extremely large, filtration is performed by using all the filtration tanks 230A to 230E. It should be noted that filtration of water to be treated and backwash of floating filter media layer can be performed in the same manner as the above-described example of filtration system 100 with the exception that, during filtration of water to be treated, the water to be treated does not directly flow from the pressure adjustment part into the filtration tank, and flows into the filtration tank through the inlet pipe for water to be treated.

Therefore, in the filtration system 200, as in the case of the above-described example of filtration system 100, different filtration tanks can be used based on the flow amount of water to be treated even if flow amount of water to be treated varies with time, and both uniform backwashing of floating filter media layer and efficient backwashing with low cost can be achieved.

Further, in the filtration system 200, instead of disposing the flow channel for water to be treated 110 in the air to allow water to be treated to overflow into the filtration tank side, water to be treated is overflowed from the tank for water to be treated 210 directly disposed on the ground to the filtration tank side. Therefore, reinforcement necessary for disposing the flow channel for water to be treated in the air is no longer required, and thus workability can be improved. Moreover, since the tank for water to be treated 210 is extended at a right angle to the longitudinal direction of the filtration system 200, the footprint can be reduced compared to the case where the tank for water to be treated 210 is extended in the longitudinal direction of the filtration system 200. Furthermore, since the water level of the tank for water to be treated 210 is the same across the surface thereof, water to be treated can be uniformly flown into the pressure adjustment part.

Although the filtration system of the present invention has been illustrated with reference to one example and another example, the filtration system of the present invention is not limited to the above-described one example and another example, and the filtration system of the present invention can be modified appropriately.

INDUSTRIAL APPLICABILITY

According to the filtration system of the present invention, even if the flow amount of water to be treated varies with time, both uniform backwashing of floating filter media layer and efficient backwashing with low cost can be achieved.

REFERENCE SIGNS LIST

100 Filtration system
110 Flow channel for water to be treated 111A to 111E Inlet valve
120A to 120E Pressure adjustment part
130A to 130E Filtration tank
131A Inlet for water to be treated
132 Floating filter media
132A to 132E Floating filter media layer
133A to 133E Upper screen
134A to 134E Backwash water pipe
135A to 135E Backwash valve
140 Filtrate storage part
150 Filtrate flow channel
200 Filtration system
210 Tank for water to be treated
211A to 211E Inlet valve
221A to 221E Inlet pipe for water to be treated
220A to 220E Pressure adjustment part
230A to 230E Filtration tank
231A to 231E Inlet for water to be treated
232 Floating filter media
232A to 232E Floating filter media layer
233A to 233E Upper screen
234A to 234E Backwash water pipe
235A to 235E Backwash valve
240 Filtrate storage part
250 Filtrate flow channel

The invention claimed is:

1. A filtration system having a plurality of filtration tanks for filtering water to be treated, comprising:

a first filtration tank having a first floating filter media layer formed of a first floating filter media, a first upper screen with a first aperture ratio, the first upper screen being disposed over the first floating filter media layer and supporting the first floating filter media, a first inlet for water to be treated disposed below the first floating filter media layer, a first backwash water supply source located over the first upper screen, and a first backwash water outlet means disposed below the first floating filter media layer and discharging backwash water supplied from the first backwash water supply source during backwashing of the first floating filter media layer; and a second filtration tank having a second floating filter media layer formed of a second floating filter media, a second upper screen with a second aperture ratio, the second upper screen being disposed over the second floating filter media layer and supporting the second floating filter media, a second inlet for water to be treated disposed below the second floating filter media layer, an inflow blocking mechanism capable of blocking inflow of water to be treated through the second inlet for water to be treated, a second backwash water supply source located over the second upper screen, and a second backwash water outlet means disposed below the second floating filter media layer and discharging backwash water supplied from the second backwash water supply source during backwashing of the second floating filter media layer, wherein the first aperture ratio is smaller than the second aperture ratio, wherein the filtration system comprises a flow channel for the water to be treated, and the first filtration tank and the second filtration tank are connected to said flow channel, and wherein the number of first backwash water outlet means is larger than the number of second backwash water outlet means.

2. The filtration system according to claim 1, wherein the first aperture ratio is 0.5 to 5% and the second aperture ratio is 2 to 30%.

3. The filtration system according to claim 1, wherein an area of the first filtration tank is 0.5 times to twice as much as an area of the second filtration tank.

4. The filtration system according to claim 1, wherein the filtration system further comprises an additional inflow blocking mechanism capable of blocking inflow of water to be treated through the first inlet for water to be treated.

5. The filtration system according to claim 2, wherein an area of the first filtration tank is 0.5 times to twice as much as an area of the second filtration tank.

6. The filtration system according to claim 2, wherein the filtration system further comprises an additional inflow blocking mechanism capable of blocking inflow of water to be treated through the first inlet for water to be treated.

7. The filtration system according to claim 3, wherein the filtration system further comprises an additional inflow blocking mechanism capable of blocking inflow of water to be treated through the first inlet for water to be treated.

8. The filtration system according to claim 5, wherein the filtration system further comprises an additional inflow blocking mechanism capable of blocking inflow of water to be treated through the first inlet for water to be treated.

* * * * *